(12) United States Patent
Inoue

(10) Patent No.: US 10,656,618 B2
(45) Date of Patent: May 19, 2020

(54) NUMERICAL CONTROLLER

(71) Applicant: FANUC CORPORATION, Minamitsuru-gun, Yamanashi (JP)

(72) Inventor: Tetsuya Inoue, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 46 days.

(21) Appl. No.: 15/656,097

(22) Filed: Jul. 21, 2017

(65) Prior Publication Data

US 2018/0024525 A1    Jan. 25, 2018

(30) Foreign Application Priority Data

Jul. 25, 2016   (JP) ................... 2016-145591

(51) Int. Cl.
  *G05B 19/402*   (2006.01)
  *G05B 19/401*   (2006.01)

(52) U.S. Cl.
  CPC ......... *G05B 19/402* (2013.01); *G05B 19/401* (2013.01); *G05B 2219/37555* (2013.01); *G05B 2219/50064* (2013.01); *Y02P 90/265* (2015.11)

(58) Field of Classification Search
  CPC ............... G05B 19/402; G05B 19/401; G05B 2219/37555; G05B 2219/50064
  See application file for complete search history.

(56) References Cited

U.S. PATENT DOCUMENTS 8,095,237 B2 *   1/2012   Habibi .................. B25J 9/1692
                                                    700/245

FOREIGN PATENT DOCUMENTS

JP   H 04-164562 A   6/1992
JP   H 07-210222 A   8/1995

OTHER PUBLICATIONS

Russell, Andrew, "Using Tactile Whiskers to Measure Surface Contours", 1992 IEEE. (Year: 1992).*

* cited by examiner

*Primary Examiner* — Carlos R Ortiz Rodriguez
(74) *Attorney, Agent, or Firm* — RatnerPrestia

(57) ABSTRACT

A numerical controller capable of reducing labor of an operator's operation in measuring a workpiece controls a machine tool equipped with an imaging device capable of outputting three-dimensional coordinates of a designated position in a captured image and a measuring instrument measuring physical quantity concerning a shape of the installed workpiece. The numerical controller includes a user interface unit displaying the image captured by the imaging device and accepting operation of designating an index point in the image that is an index used when the measuring instrument measures the physical quantity concerning the shape of the workpiece, a program generation unit analyzing the image and coordinates of the index point to narrow down measurement item candidates concerning the workpiece measurement, and generating a program for giving instructions on the measurement operation based on the three-dimensional coordinates of the index point and a measurement item selected from the measurement item candidates, and an execution unit executing the program.

2 Claims, 6 Drawing Sheets

NUMERICAL CONTROLLER

BACKGROUND OF THE INVENTION

1. Field of the Invention

The present invention relates to a numerical controller, and in particular to a numerical controller having a function of automating a measurement approach by using a camera.

2. Description of the Related Art

When attaching a measuring probe to the head of a machine tool and measuring a workpiece manually using a general-purpose measurement program, the operator performs measurement in accordance with the following procedures.

Procedure 1: Place the workpiece on the bed.
Procedure 2: Select a program for measurement suitable for the shape of the measurement portion of the workpiece.
Procedure 3: Manually move the probe to the measuring object spot for positioning.
Procedure 4: Run the program for measurement.

On the other hand, Japanese Patent Application Laid-open No. 07-210222 A and Japanese Patent Application Laid-open No. 04-164562 A, for example, disclose techniques for moving the tool to a position corresponding to a point designated by the operator on an image of the workpiece surface in plan view captured by an imaging unit as conventional techniques for enabling easy positioning of a tool or the like.

As described above, when manually measuring a workpiece, the operator needs to perform an operation of selecting an appropriate program from a plurality of measurement programs and an operation of moving the probe to the measuring object spot. Such an operation is troublesome for the operator and it is necessary to repeat the selecting operation of the measurement program and the movement operation of the probe when many measuring object spots exist on the workpiece, and there are many cases that the erroneous measurement programs are selected during the repetition.

In the techniques disclosed in Japanese Patent Application Laid-open No. 07-210222 A and Japanese Patent Application Laid-open No. 04-164562 A, although the tool can be moved to a point designated on the captured planar image of the workpiece surface, there is a problem that the position in the Z axis direction cannot be designated. Therefore, in the measurement of an uneven workpiece, there remains a problem that the probe needs to be manipulated manually in the Z direction, which is troublesome for the operator and easily causes a mistake.

SUMMARY OF THE INVENTION

Therefore an object of the present invention is to provide a numerical controller capable of reducing labor of an operator's operation in measuring a workpiece.

In the present invention, an imaging unit having a distance measuring function is installed in a machine tool, and images of the workpiece and the periphery of the workpiece captured by the imaging unit are displayed on a screen, and the operator is prompted to indicate the approach point of the measurement program on the displayed image. When the operator designates the approach point of the measurement program, the coordinates in the machine coordinate system corresponding to the designated point on the image are calculated, and a program is generated for moving the probe to the approach point based on the calculated coordinates in the machine coordinate system. In order to obtain the coordinates in the machine coordinate system corresponding to the designated point on the image, a reference mark is provided in advance in the vicinity of the workpiece (a position which can be imaged together with the workpiece by the imaging unit, for example, on the bed on which the workpiece is placed) and the coordinates of the reference mark in the machine coordinate system are measured in advance.

The image captured by the imaging unit is analyzed, and appropriate candidates of the measurement program is extracted from a plurality of measurement programs prepared in advance on the basis of the analysis result, and the operator is allowed to select a measurement program to be used from the extracted measurement program candidates.

Then, the generated program for moving a probe is executed to move the probe to the approach point, and thereafter the measurement program selected by the operator is executed.

A numerical controller according to the present invention controls a machine tool including an imaging device capable of outputting three-dimensional coordinates of a designated position in a captured image and a measuring instrument for measuring physical quantity related to a shape of an installed workpiece, and the numerical controller includes a user interface unit that displays an image captured by the imaging device and accepts operation of designating an index point in the image that is an index used when the measuring instrument measures the physical quantity related to the shape of the workpiece; a program generation unit that analyzes the image and coordinates of the index point, that narrows down measurement item candidates related to measurement of the workpiece based on the analysis result, and that generates a program for giving an instruction on operation of measuring the workpiece by the measuring instrument based on the three-dimensional coordinates of the index point and a measurement item selected from the measurement item candidates; and an execution unit that executes the program.

In the numerical controller according to the present invention, the index point includes at least an approach point that is an initial position of the measuring instrument when the measuring instrument measures the workpiece, and the program generation unit generates a program for giving an instruction on operation of measuring the workpiece so as to move the measuring instrument to a position of three-dimensional coordinates of the approach point when the measuring instrument measures the workpiece.

The numerical controller according to the present invention, further includes a measurement program storage unit that stores general-purpose measurement programs corresponding to a plurality of measurement items, wherein the program generation unit generates a program for giving an instruction on operation of measuring the workpiece so as to call a general-purpose measurement program corresponding to the measurement item selected from the measurement item candidates, from the measurement program storage unit.

In the numerical controller according to the present invention, the index point includes at least an approach point that is an initial position of the measuring instrument when the measuring instrument measures the workpiece and an auxiliary point that designates a direction of a measurement portion of the workpiece as viewed from the approach point, and the program generation unit analyzes the image and coordinates of the approach point and the auxiliary point and narrows down the measurement item candidates related to the measurement of the workpiece based on an analysis result.

According to the present invention, the movement of the probe up to the measuring object spot is automated, and the options of the measurement program used for the measurement are narrowed down, so that labor and errors due to manual operation by the operator can be reduced.

BRIEF DESCRIPTION OF THE DRAWINGS

The foregoing and other objects and features of the present invention will become apparent from the following description of embodiments with reference to the accompanying drawings. Among those drawings.

DETAILED DESCRIPTION OF THE PREFERRED EMBODIMENTS

Hereinafter, embodiments of the present invention will be described with reference to the drawings.

Figure 1:
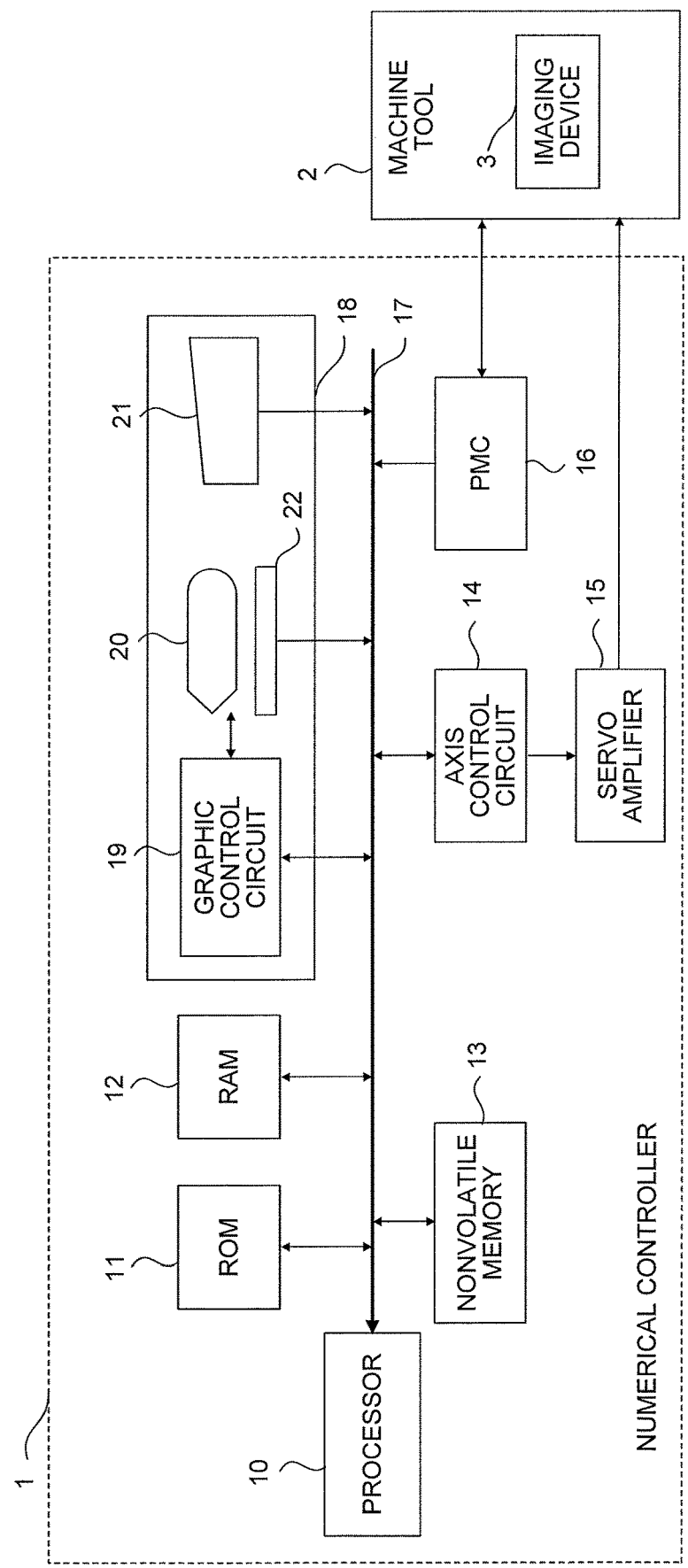
FIG. 1 is a hardware configuration diagram showing a main part of a numerical controller according to an embodiment of the present invention.

FIG. 1 is a hardware configuration diagram showing a main part of a numerical controller according to an embodiment of the present invention. The numerical controller 1 is mainly composed of a processor 10. The processor 10 controls the entire numerical controller 1 according to a system program stored in a ROM 11. An EPROM or an EEPROM is used as the ROM 11.

A DRAM or the like is used for a RAM 12, and temporary calculation data, display data, input/output signals, and the like are stored in the RAM 12. A CMOS or an SRAM backed up by a battery (not shown) is used in a nonvolatile memory 13, which stores parameters, a machining program, tool correction data, and the like to be held even after the power supply is turned off.

An LCD/MDI unit 18 is disposed at the front surface of the numerical controller 1 or at the same position as the machine operation panel, and is used for displaying data and figures, inputting data, and operating the numerical controller 1.

A graphic control circuit 19 converts digital signals such as numerical data and graphic data into raster signals for display and sends the signals to a display device 20, and the display device 20 displays these numerical values and figures. A liquid crystal display device is mainly used for the display device 20.

An input device 21 is composed of a keyboard having numerical keys, symbolic keys, character keys and function keys, and a pointing device such as a mouse, and is used for creating and editing machining programs, and for operating the numerical controller.

A touch panel 22 has a function of detecting an operation such as touch or drag by an operator. The touch panel 22 is arranged so as to be superposed on the screen of the display device 20 and can detect the operation performed by the operator, on the software key, the software button, and the software switch displayed on the screen of the display device 20 through the touch panel 22. Incidentally, the touch panel 22 and the display device 20 may be combined into a single device.

An axis control circuit 14 receives a command of an axis movement from the processor 10 and outputs the axis movement command to a servo amplifier 15. The servo amplifier 15 amplifies this movement command and drives a servomotor coupled to a machine tool 2 to control the relative motion between the tool of the machine tool 2 and the workpiece. Although only one axis is shown in FIG. 1, the axis control circuits 14 and the servo amplifiers 15, the number of which corresponds to the number of axes of the servo motor, are provided.

A programmable machine controller (PMC) 16 receives an M (auxiliary) function signal, an S (spindle speed control) function signal, a T (tool selection) function signal, etc. from the processor 10 via a bus 17. Then, the PMC 16 executes processing of these signals by a sequence program to output an output signal so as to control operations or the like of a pneumatic component, hydraulic equipment, an electromagnetic actuator, and an imaging device 3 described later in the machine tool 2. Further also receiving various signals such as button signals and switch signals of the machine control panel in the machine tool 2, the PMC 16 performs sequence processing, and transfers necessary input signals to the processor 10 via the bus 17.

In FIG. 1, a spindle motor control circuit, a spindle motor amplifier and the like are omitted.

The machine tool 2 to be controlled by the numerical controller 1 is provided with the imaging device 3. In addition to a function of outputting the captured image as image data, the imaging device 3 used in the present invention has a function as a so-called three-dimensional measurement camera capable of obtaining three-dimensional coordinates of a designated position in the captured image. As the imaging device 3 of the present invention, a general three-dimensional measurement camera using a stereo method, an optical cutting method, or the like can be used. Alternatively, a configuration in which three-dimensional coordinates of a designated position can be obtained by placing normal cameras at two or more places and analyzing a plurality of captured images may be used as the imaging device 3, and a configuration in which one ordinary camera is held by a spindle, a robot or the like and moved to analyze a plurality of images captured at two or more places so as to obtain three-dimensional coordinates of a designated position may be used as the imaging device 3. The details of the technique of measuring three-dimensional coordinates by the three-dimensional measuring camera and the details of the technique of obtaining three-dimensional coordinates by analyzing a plurality of images are already known, and thus the description in this specification is omitted.

The three-dimensional coordinates outputted by the imaging device 3 may be the coordinates of the camera coordinate system which is the coordinate system regarding the imaging device 3 as the origin, and in such a case, the numerical controller 1 converts the coordinates in the three-dimensional coordinates acquired from the imaging device 3 into the coordinates in the machine coordinate system and uses the coordinates.

Figure 2:
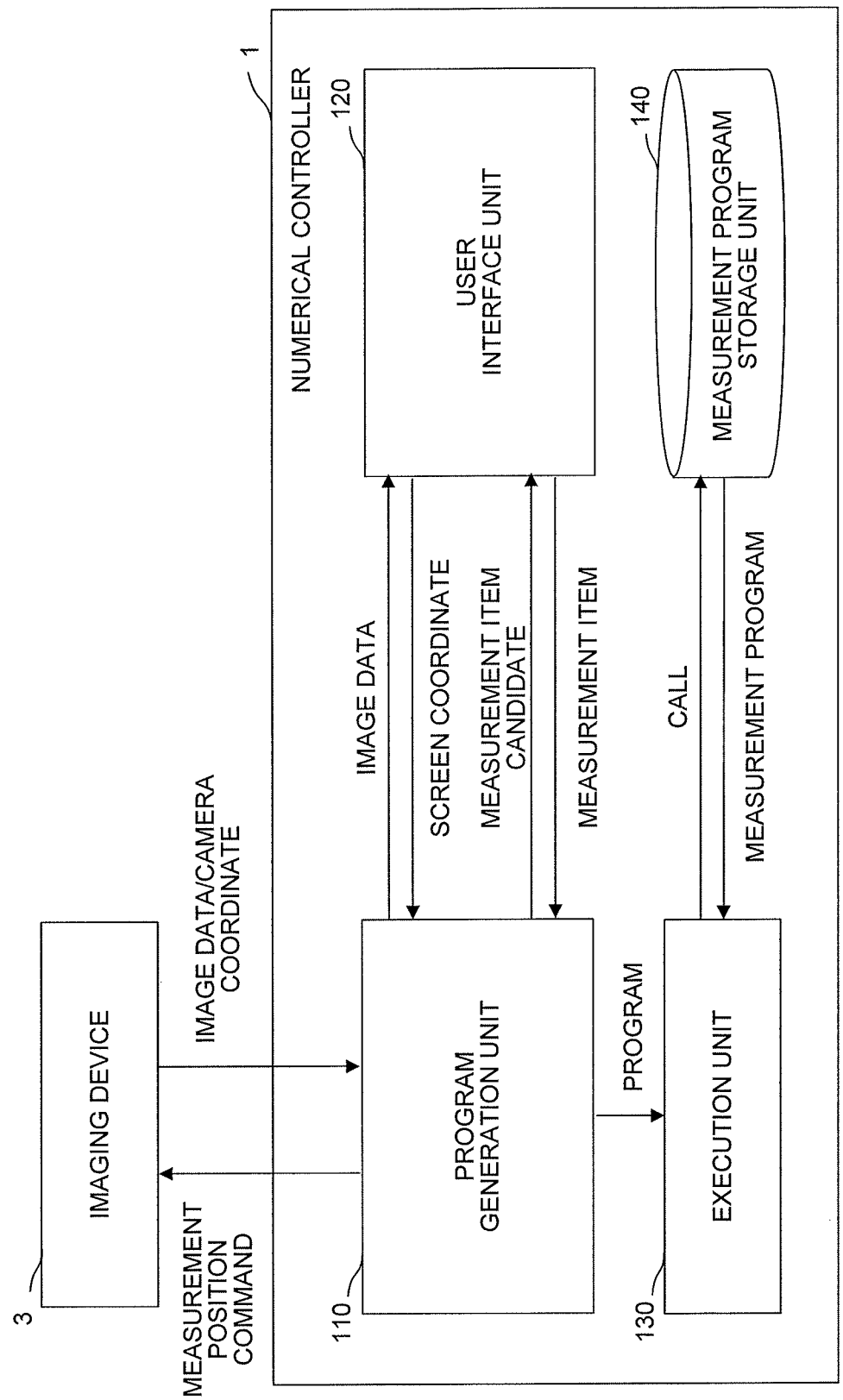
FIG. 2 is a schematic functional block diagram of the numerical controller according to an embodiment of the present invention.

FIG. 2 shows a schematic functional block diagram according to one embodiment in the case where a function of automating the measurement operation provided by the present invention is implemented in the numerical controller 1 shown in FIG. 1 by a system program. Each functional unit provided in the numerical controller 1 shown in FIG. 2 is achieved by the processor 10 shown in FIG. 1 executing a system program so as to operate each part of the numerical controller 1 and to provide each function.

The numerical controller 1 of the present invention includes a program generation unit 110, a user interface unit 120, an execution unit 130, and a measurement program storage unit 140.

The program generation unit 110 is a function unit for generating a program for automating the measurement operation. The program generation unit 110 instructs the imaging device 3 to capture an image of the workpiece and the periphery of the workpiece in accordance with the instruction of the operator, and when acquiring the image data from the imaging device 3 as a response, the program generation unit 110 outputs the acquired image data to the user interface unit 120 to be described later.

Further, when the operator designates the coordinates (screen coordinate system) of the index point serving as the index of the measurement of the workpiece from the user interface unit 120, the program generation unit 110 converts the coordinates (screen coordinate system) of the designated index point into the coordinates of the index point on the image, and outputs a measurement position command for acquiring three-dimensional coordinates in the camera coordinate system corresponding to the coordinates of the index point on the image to the imaging device 3. Then, the program generation unit 110 converts the three-dimensional coordinates of the index point in the camera coordinate system obtained from the imaging device 3 in response to the measurement position command into the three-dimensional coordinates in the machine coordinate system, and obtains coordinates of the approach point on the basis of the converted three-dimensional coordinates in the machine coordinate system.

Thereafter, the program generation unit 110 analyzes the coordinates of the approach point and the image data to specify at least one candidate for the measurement item, and outputs the specified candidate for the measurement item to the user interface unit 120. The program generation unit 110 receives the measurement item selected by the operator from the user interface unit 120, and generates a program capable of measuring for the received measurement item, and outputs the program to the execution unit 130 to be described later.

The program generated by the program generation unit 110 is a program for giving instructions to perform the following procedures.
Procedure 1: Move the measuring instrument to the approach point.
Procedure 2: Call the measurement program corresponding to the measurement item selected by the operator.

The user interface unit 120 is a function unit for providing display of information to the operator and accepting input operation from the operator. When the image data of the image of the workpiece and the periphery of the workpiece is inputted from the program generation unit 110, the user interface unit 120 displays the inputted image data as an image on the display device 20. Then, the user interface unit 120 prompts the operator to designate the position of the approach point and the auxiliary point on the image, and when the position is designated on the displayed image by the operation of the operator, the user interface unit 120 outputs the coordinates of the designated position (screen coordinates) in the image data to the program generation unit 110.

When input of candidates for the measurement item is carried out from the program generation unit 110, the user interface unit 120 displays a list of the inputted candidates of the measurement item on the display device 20. Then, the user interface unit 120 prompts the operator to select the measurement item to be measured, and when the measurement item to be measured is selected from among the displayed measurement item candidates by the operation of the operator, the user interface unit 120 outputs the selected measurement item to the program generation unit 110.

The execution unit 130 executes the program inputted from the program generation unit 110, and calls the measurement program from the measurement program storage unit 140 in accordance with the measurement item selected by the operator, thereby executing the measurement program. The measurement program storage unit 140 stores general-purpose measurement programs that operate with the approach point as the origin of the workpiece coordinate system in advance in association with respective measurement items.

Figure 3:
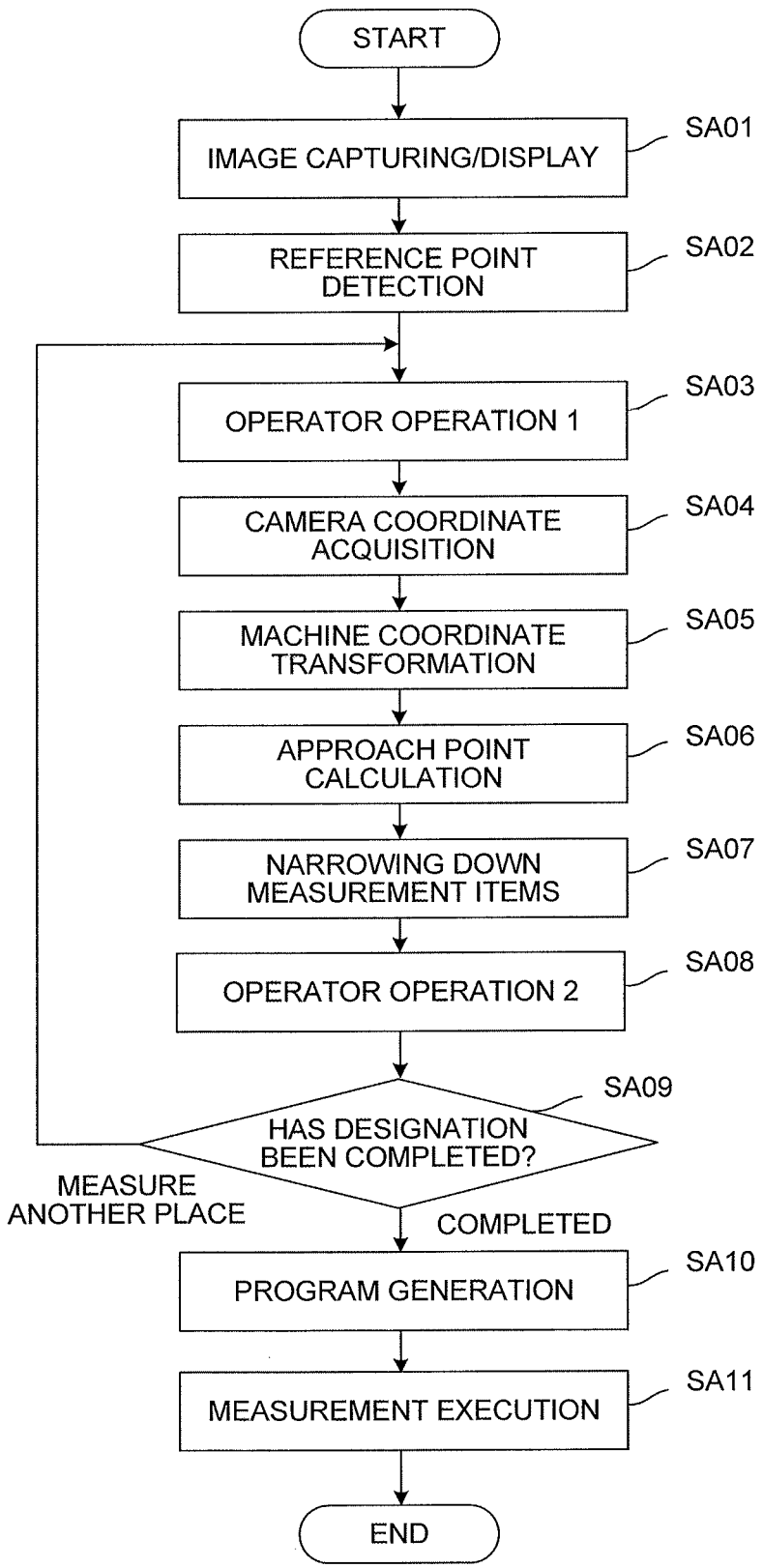
FIG. 3 is a schematic flowchart of processing executed on the numerical controller according to an embodiment of the present invention.

FIG. 3 is a flowchart showing a flow of a measurement operation automated by the numerical controller 1 of the present invention.
[Step SA01: Image Capturing/Display]
The program generation unit 110 instructs the imaging device 3 to capture an image of the workpiece and the periphery of the workpiece and acquires image data from the imaging device 3 as a response therefrom. The program generation unit 110 outputs the acquired image data to the user interface unit 120, and the user interface unit 120 displays the inputted image data as an image on the display device 20.

Figure 4:
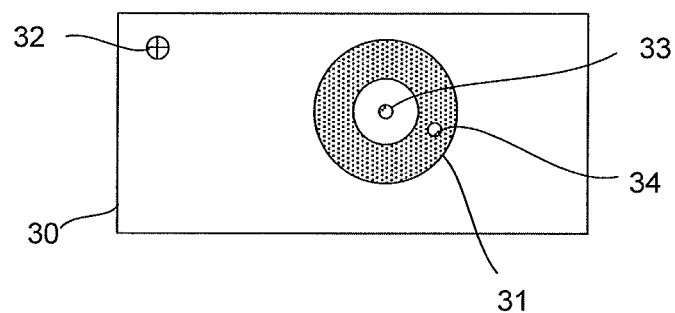
FIG. 4 shows an example of displaying an image captured by an imaging unit on a display device of the numerical controller.

FIG. 4 shows an example of an image displayed on the display device 20. In the image example shown in FIG. 4, a cylindrical workpiece 31 having a hollow in the interior is installed on a bed 30. A reference mark 32 is provided on the bed 30. The coordinates (Xm1, Ym1, Zm1) of the reference mark 32 in the machine coordinate system are measured in advance and stored in the nonvolatile memory 13 or the like of the numerical controller 1. Incidentally, an approach point 33 and an auxiliary point 34 indicate the positions obtained from the points designated by the operator, and are not displayed on the image at this stage.
[Step SA02: Reference Point Detection]
The program generation unit 110 detects the reference mark 32 on the bed 30 by analyzing the image data, and acquires the three-dimensional coordinates of the detected reference mark 32 from the imaging device 3. The three-dimensional coordinates of the reference mark 32 acquired from the imaging device 3 are coordinates of the camera coordinate system in which the camera is regarded as the origin, and the coordinates of the reference mark 32 in the machine coordinate system are measured in advance and stored in the nonvolatile memory 13 of the numerical controller 1 or the like.

Figure 5:
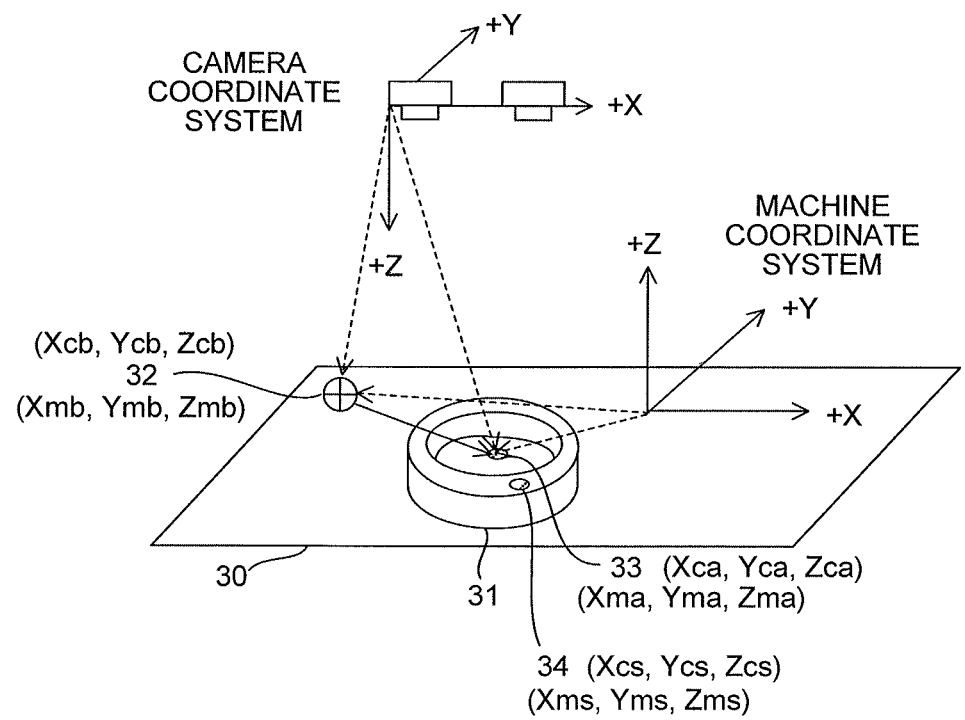
FIG. 5 is a diagram for illustrating the relationship between a camera coordinate system and a machine coordinate system.

As shown in FIG. 5, the relationship between the camera coordinate system and the machine coordinate system is such that the respective directions of the X axes and the Y axes coincide with each other and the respective directions of the Z axes are opposite to each other.

[Step SA03: Operator Operation 1]

The user interface unit 120 prompts the operator to designate the positions of the approach point 33 and the auxiliary point 34 on the image displayed on the display device 20 and accepts the operator's operation. In accordance with the item to be measured, the operator designates the positions of the approach point 33 and the auxiliary point 34 on the image as index points serving as indexes of the measurement by operating the input device 21 and the touch panel 22 (refer to FIG. 4). The approach point 33 is the initial position of the measuring instrument when the measurement program is operated. Further, the auxiliary point 34 designates the direction of the measurement portion of the workpiece as viewed from the approach point 33, and is used for determining the Z coordinate of the final approach point and selecting the measurement program.

[Step SA04: Camera Coordinate Acquisition]

The user interface unit 120 notifies the program generation unit 110 about the screen coordinates of the index points (positions of approach point 33 and auxiliary point 34 on the image) designated by the operator.

The program generation unit 110 calculates two-dimensional coordinates of the index point on the image by multiplying the screen coordinate by the ratio of the image size on the screen to the size of the original image captured by the imaging device 3, and obtains three-dimensional coordinates ($X_{ca}$, $Y_{ca}$, $Z_{ca}$) ($X_{cs}$, $Y_{cs}$, $Z_{cs}$) in the camera coordinate system corresponding to the two-dimensional coordinates of the index point on the image from the imaging device 3. Further, the program generation unit 110 analyzes the image data to obtain two-dimensional coordinates of the reference mark 32 on the image, and obtains three-dimensional coordinates ($X_{cb}$, $Y_{cb}$, $Z_{cb}$) in the camera coordinate system corresponding to the two-dimensional coordinates of the reference mark 32 on the image from the imaging device 3.

[Step SA05: Machine Coordinate Transformation]

The program generation unit 110 obtains the three-dimensional coordinates ($X_{ma}$, $Y_{ma}$, $Z_{ma}$) ($X_{mc}$, $Y_{mc}$, $Z_{mc}$) of the index points (approach point 33 and auxiliary point 34) in the machine coordinate system respectively using the following equation 1 on the basis of the three-dimensional coordinates ($X_{ca}$, $Y_{ca}$, $Z_{ca}$) ($X_{cs}$, $Y_{cs}$, $Z_{cs}$) of the index points (positions of the approach point 33 and the auxiliary point 34 on the image) in the camera coordinate system, the three-dimensional coordinates ($X_{cb}$, $Y_{cb}$, $Z_{cb}$) of the reference mark 32 in the camera coordinate system, and the coordinates ($X_{mb}$, $Y_{mb}$, $Z_{mb}$) of the reference mark 32 in the machine coordinate system (refer to FIG. 5).

Equation of the conversion from coordinates ($X_c$, $Y_c$, $Z_c$) of camera coordinate system into machine coordinates ($X_m$, $Y_m$, $Z_m$):

$$X_m = X_{mb} + (X_c - X_{cb})$$

$$Y_m = Y_{mb} + (Y_c - Y_{cb})$$

$$Z_m = Z_{mb} - (Z_c - Z_{cb}) \quad \text{[Equation 1]}$$

[Step SA06: Approach Point Calculation]

Figure 6:
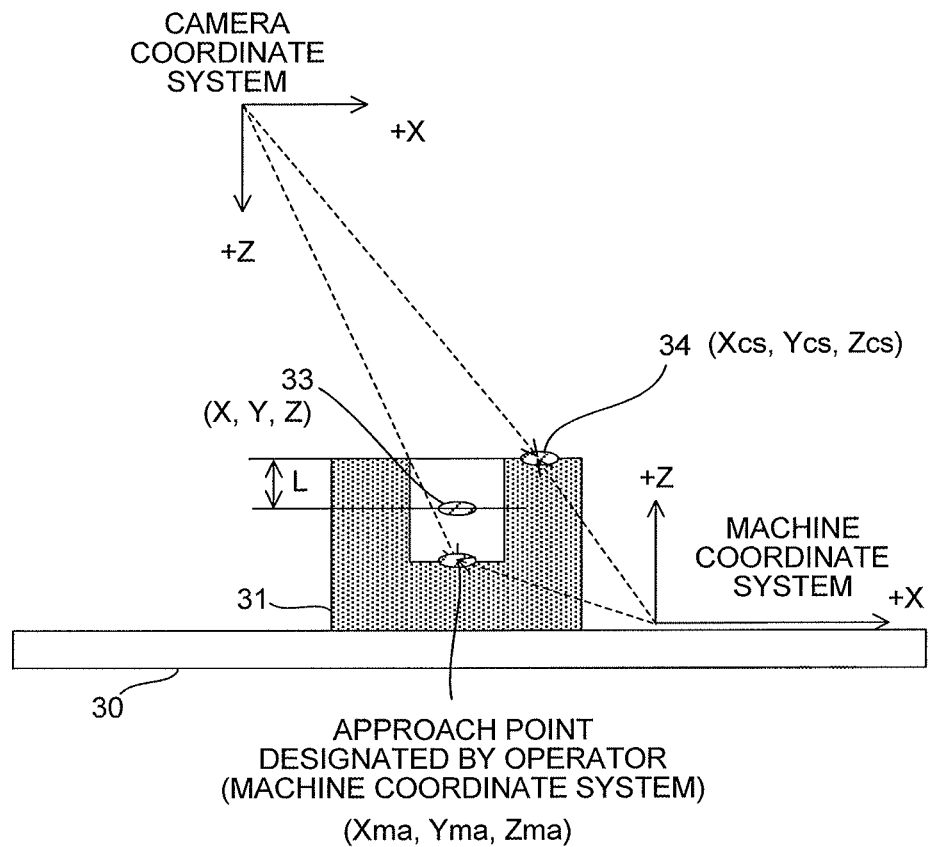
FIG. 6 is a diagram for illustrating a method of obtaining an approach point.

The program generation unit 110 obtains three-dimensional coordinates (X, Y, Z) of an approach point in the machine coordinate system that actually the measuring instrument is made to approach using the following equation 2 on the basis of the three-dimensional coordinates ($X_{ma}$, $Y_{ma}$, $Z_{ma}$) of the approach point 33 in the machine coordinate system designated by the operator, the three-dimensional coordinates ($X_{ms}$, $Y_{ms}$, $Z_{ms}$) of the auxiliary point in the machine coordinate system and a margin value L determined in advance and set in the numerical controller 1 (see FIG. 6). Incidentally, in equation 2, $\alpha (>0)$ is an allowance value set in the numerical controller 1 in advance.

$$X = X_{ma}$$

$$Y = Y_{ma}$$

$$Z = Z_{ms} - L \quad \text{[Equation 2]}$$

(however, when $Z_{ms} - Z_{ma} - \alpha \leq L$ is satisfied, an error is determined)

[Step SA07: Narrowing Down Measurement Items]

Figure 7:
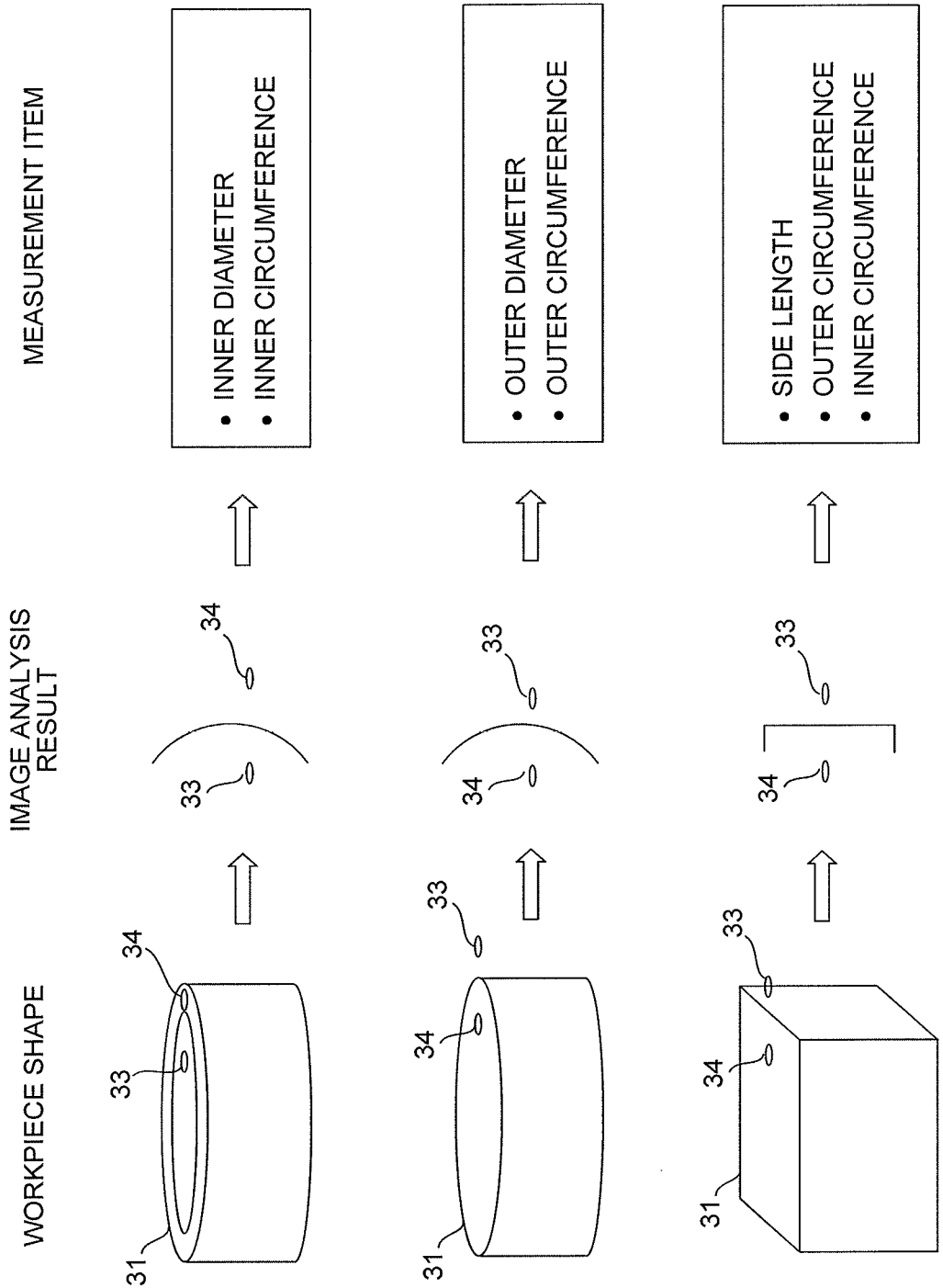
FIG. 7 is a diagram for illustrating a method of narrowing down measurement items.

The program generation unit 110 analyzes the image captured by the imaging device 3, examines the shape of the measuring object between the approach point and the auxiliary point designated by the operator, and narrows down the measurement items. For example, as shown in FIG. 7, as a result of analyzing the relationship between an image obtained by binarizing an image captured by the imaging device 3 and the approach point and the auxiliary point, a narrowing-down method of the measurement items is considered, for example, in which when the approach point is inside a circular arc drawn by the edge of the workpiece with respect to the auxiliary point, the inner diameter and the inner circumference are taken as candidates of the measurement items, and on the contrary, when the approach point is outside the circular arc, the outer diameter and the outer circumference are taken as candidates of the measurement items, and further when the approach point is outside a channel shape drawn by the edge of the workpiece with respect to the auxiliary point, the length of the side, the inner circumference, and the outer circumference are taken as the candidates. In this way, the approach point, the auxiliary point, the shape and position of the workpiece and the like are analyzed, and the candidates of the measurement items which the operator is planning to measure are narrowed down. The candidates of the measurement items for the relation between the image obtained by binarizing an image captured by the imaging device 3, approach point and auxiliary point may be set in advance in a memory of the numerical controller 1.

[Step SA08: Operator Operation 2]

The program generation unit 110 instructs the user interface unit 120 to display a list of candidates of the measurement items that have been narrowed down and the user interface unit 120 receives the operator's operation for selecting a measurement item to be measured from the measurement item candidates.

[Step SA09]

The program generation unit 110 inquires from the operator via the user interface unit 120 whether designation of a measurement item has been completed. When the operator inputs information that the designation of the measurement item has been completed, the program generation unit 110 forwards the processing to step SA10, and when information that measuring another location is necessary is inputted, the program generation unit 110 returns the processing to step SA03.

[Step SA10: Program Generation]

The program generation unit 110 moves the measuring instrument rapidly to the approach point (X, Y, Z) and generates a program for calling a general-purpose measurement program corresponding to the measurement item selected by the operator as a sub-program. Incidentally, a general-purpose measurement program is prepared and stored in advance in the measurement program storage unit 140 as a program that operates regarding the approach point as the origin of the workpiece coordinate system. When instructed to measure a plurality of places (in a case where steps SA03 to SA08 are repeatedly executed), the program generation unit 110 generates a program that continuously executes a series of processes of moving to the approach point and calling the measurement program for each place.

[Step SA11: Measurement Execution]

Figure 8:
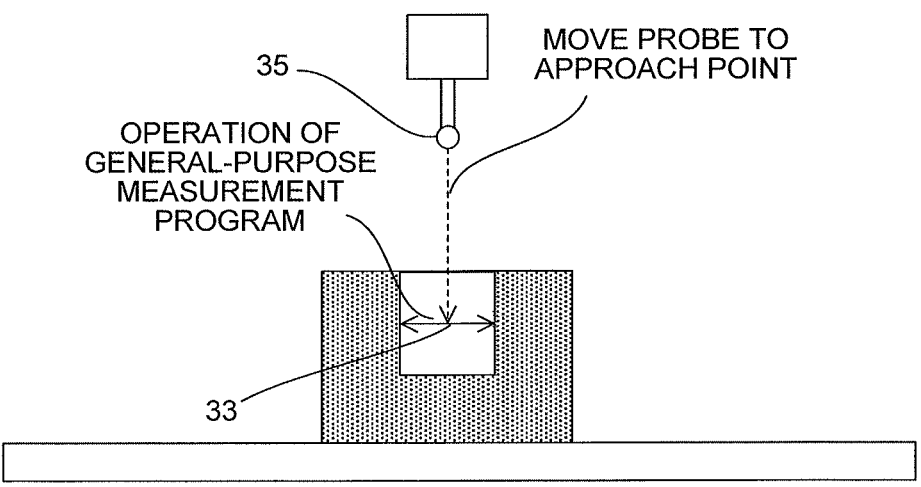
FIG. 8 is a diagram showing an operation example of a probe based on a program generated by a program generation unit and a general-purpose measurement program called out by the program.

The execution unit 130 executes the program generated by the program generation unit 110. FIG. 8 shows an operation example of a measuring instrument 35 (for example, a probe, etc.) based on the program generated by the program generation unit 110 and a general-purpose measurement program called by the program.

Although the embodiments of the present invention have been described so far, the present invention is not limited only to the examples of the above-described embodiments, and can be implemented in various modes by making appropriate modifications.

The invention claimed is:

1. A numerical controller that controls a machine tool including an imaging device capable of outputting three-dimensional coordinates of a designated position in a captured image and a measuring probe that measures physical quantity related to a shape of an installed workpiece, the numerical controller comprising:
    a user interface unit that displays the image captured by the imaging device and accepts operation of designating an index point in the image, which is an index used when the measuring probe measures the physical quantity related to the shape of the workpiece;
    a program generation unit that analyzes the image and coordinates of the index point, narrows down measurement item candidates related to measurement of the workpiece based on an analysis result, and generates a program for giving an instruction on operation of measuring the workpiece by the measuring probe based on three-dimensional coordinates of the index point and a measurement item selected from the measurement item candidates;
    an execution unit that executes the program to maneuver the measuring probe relative to the workpiece to measure the physical quantity related to the shape of the workpiece; and
    a measurement program storage unit that stores general-purpose measurement programs corresponding to a plurality of measurement items,
    wherein the program generation unit generates a program for giving an instruction on operation of measuring the workpiece so as to call a general-purpose measurement program corresponding to the measurement item selected from the measurement item candidates, from the measurement program storage unit,
    wherein the index point includes at least an approach point that is an initial position of the measuring probe when the measuring probe measures the workpiece and an auxiliary point that designates a direction of a measurement portion of the workpiece as viewed from the approach point, and
    wherein the program generation unit narrows down the measurement item candidates related to the measurement of the workpiece by analyzing the image and coordinates of the approach point and the auxiliary point to examine the shape of the workpiece between the approach point and the auxiliary point.

2. The numerical controller according to claim 1, wherein the index point includes at least an approach point that is an initial position of the measuring instrument when the measuring instrument measures the workpiece, and
    the program generation unit generates a program for giving an instruction on operation of measuring the workpiece so as to move the measuring instrument to a position of three-dimensional coordinates of the approach point when the measuring instrument measures the workpiece.

* * * * *